United States Patent [19]

Ikeda et al.

[11] Patent Number: 4,532,293

[45] Date of Patent: Jul. 30, 1985

[54] α-CYANOACRYLATE INSTANT ADHESIVE COMPOSITION CONTAINING BTDA OR BTA

[75] Inventors: Takayuki Ikeda, Shiga; Kazuo Kouhara, Moriyama; Minoru Sasaki, Uji, all of Japan

[73] Assignee: Kabushiki Kaisha Alpha Giken, Osaka, Japan

[21] Appl. No.: 662,430

[22] PCT Filed: Feb. 4, 1984

[86] PCT No.: PCT/JP84/00033

§ 371 Date: Oct. 9, 1984

§ 102(e) Date: Oct. 9, 1984

[87] PCT Pub. No.: WO84/03097

PCT Pub. Date: Aug. 16, 1984

[30] Foreign Application Priority Data

Feb. 9, 1983 [JP] Japan .................................. 58-21293

[51] Int. Cl.³ .......................... C09J 3/14; C08F 22/32
[52] U.S. Cl. ................................ 524/754; 204/159.23;
524/109; 524/292; 524/555; 524/772; 524/776;
524/850; 526/204; 526/208; 526/298
[58] Field of Search ............... 524/109, 298, 555, 850,
524/754, 776, 772, 752, 292; 526/208, 204, 298;
204/159.23

[56] References Cited

U.S. PATENT DOCUMENTS

| | | | |
|---|---|---|---|
| 3,699,127 | 10/1972 | O'Sullivan et al. | 524/850 |
| 4,022,674 | 5/1977 | Rosen | 204/159.22 |
| 4,079,183 | 3/1978 | Green | 560/52 |
| 4,085,260 | 4/1978 | Labana et al. | 525/386 |
| 4,091,048 | 5/1978 | Labana et al. | 525/385 |
| 4,125,494 | 11/1978 | Schoenberg et al. | 524/850 |
| 4,196,271 | 4/1980 | Yamada et al. | 525/259 |
| 4,281,152 | 7/1981 | Huemmer et al. | 204/159.22 |
| 4,297,160 | 10/1981 | Kusayama et al. | 524/850 |
| 4,309,524 | 1/1982 | Huemmer et al. | 526/316 |
| 4,313,865 | 2/1982 | Teramoto et al. | 524/850 |
| 4,324,281 | 4/1982 | Ravagnani et al. | 524/112 |
| 4,338,171 | 7/1982 | Barie et al. | 524/776 |
| 4,444,933 | 4/1984 | Columbus et al. | 524/293 |

FOREIGN PATENT DOCUMENTS

| | | | |
|---|---|---|---|
| 0063037 | 10/1982 | European Pat. Off. | 524/850 |
| 3209238 | 9/1983 | Fed. Rep. of Germany . | |
| 0077145 | 6/1977 | Japan . | |
| 0090536 | 7/1977 | Japan . | |
| 0080336 | 7/1977 | Japan . | |
| 0164175 | 10/1982 | Japan . | |
| 8200829 | 3/1982 | PCT Int'l Appl. | 524/850 |

OTHER PUBLICATIONS

C.A. 101-111497 (14), Korshak et al., 1984.
C.A. 98-108587 (A14), East Germany 156365, (8-1982).
C.A. 97-93340 (12) Belgium 890553, (3-1982), Loctite
C.A. 93-222044(b) (24), DE3006960, (8-1980), Carlblom.

Primary Examiner—Herbert J. Lilling
Attorney, Agent, or Firm—Armstrong, Nikaido, Marmelstein & Kubovcik

[57] ABSTRACT

α-cyanoacrylate instant adhesive compositions obtained by adding benzophenonetetracarboxylic acid or anhydride thereof to α-cyanoacrylate and showing superior heat resistance of the degree of 150° C. with keeping instant adhesive capacity.

1 Claim, No Drawings

α-CYANOACRYLATE INSTANT ADHESIVE COMPOSITION CONTAINING BTDA OR BTA

TECHNICAL FIELD

The present invention relates to α-cyanoacrylate instant adhesive compositions, in particular to α-cyanoacrylate instant adhesive compositions having remarkably improved heat resistance.

BACKGROUND ART

α-cyanoacrylate adhesives have been widely used in not only various fields of industry but also the fields such as 'do it yourself' and hobby handicrafts at home since they have many advantages, in addition to strong adhesion, such as fast setting time, handiness owing to lower viscosity, nonpollution owing to the discontainment of solvent and prevention of micropores from forming on the bond surface accompanied with the evaporation of solvents. On the other hand, it has been indicated that they are inferior in heat resistance. This disadvantage has been serious in the cases which the heat resistance is required, for example in bonding of articles, parts and the like prior to burning coating.

In order to improve such a disadvantage various methods are proposed. For example heat resistance of α-cyanoacrylate is tried to be strong by adding N,N'-substituted bis-maleimide compounds (Japanese Pat. Publication No. 11688/1977), maleic anhydride or derivatives thereof (Japanese Pat. Publication No. 12737/1977), isocyanate compounds or polyisocyanate compounds (Japanese Pat. Publication No. 19418/1979), hydroxyalkyl esters of α,β-unsaturated carboxylic acids or hydroxyhalogenoalkyl esters of α,β-unsaturated carboxylic acids (Japanese Pat. Laying-Open No. 110635/1978) and sulfone compounds and dicarboxylic acid anhydrides (Japanese Pat. Laying-Open No. 66980/1980) thereto, respectively.

However, such additives have been apt to prolong the setting time increasingly with the improvement in heat resistance in general. Since it goes without saying that the fast cure is the greatest characteristic of α-cyanoacrylate adhesives, the prolonged setting time damages the worth as instant adhesives. Although the heat resisting temperature can be increased to about 250° C. at maximum according to the invention disclosed in Japanese Pat. Publication No. 11688/1977 cited at first, it is necessary to turn α-cyanoacrylate adhesives into prepregs or films prior to the use thereof. Therefore, they can no longer be called instant adhesives.

It is an object of the present invention to provide adhesives having remarkably improved heat resistance with holding the high cure speed suitable for instant adhesives.

DISCLOSURE OF THE INVENTION

The inventors found that the following specified compounds were effective as additives giving heat resistance to α-cyanoacrylate adhesives from the investigation of a large number of additives to attain the above described object.

That is to say, α-cyanoacrylate instant adhesive compositions according to the present invention is characterized by that benzophenonetetracarboxylic acid or anhydride thereof is incorporated into α-cyanoacrylate. α-cyanoacrylate described herein designates ester compounds expressed by the following general formula:

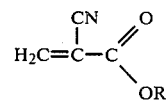

wherein a substituent R is an alkyl group, a cycloalkyl group, an alkylene group, an alkyne group, an aralkyl group, a phenyl group, an alcoxyalkyl group, a halogenoalkyl group, a cyanoalkyl group and the like. The examples of said substituent R include a methyl group, an ethyl group, a n-propyl group, a n-butyl group, an isobutyl group, a t-butyl group, an amyl group, an iso-amyl group, a n-hexyl group, a n-heptyl group, a n-octyl group, a n-decyl group, a n-undecyl group, a n-dodecyl group, a cetyl group, a vinyl group, an allyl group, a propargyl group, a cyclohexyl group, a phenyl group, a benzyl group, a phenetyl group, a 2-methoxyethyl group, a 2-methoxyisopropyl group, a 2-ethoxyethyl group, a 2-chloroethyl group, a 2-trifluoroethyl group, a hexafluoroisobutyl group, a 2-cyanoethyl group and the like.

Adhesive compositions according to the present invention contain benzophenonetetracarboxylic acid or anhydride thereof as an indispensable ingredient in addition to the above described α-cyanoacrylate or the mixtures thereof. It is desirable that said benzophenonetetracarboxylic acid or anhydride thereof is added at a ratio of at least 0.01% by weight, preferably at least 0.1% by weight based on α-cyanoacrylate. If it is added at a ratio less than 0.01% by weight, a sufficient heat resistance cannot be obtained. Although heat resistance of such compositions is increased with an increase of the quantity of said compound added, the maximum amount of said compound added is up to the solubility limit of said compound to α-cyanoacrylate. This solubility limit is dependent upon the kind of α-cyanoacrylate used and the kind of said compound. It is at most several % by weight.

Adhesive compositions according to the present invention may contain various kinds of additive for use in α-cyanoacrylate adhesives including stabilizers, plasticizers, cross-linking agents and coloring matters in addition to said α-cyanoacrylate and said compound.

Stabilizers desribed herein include antioxidants or radical polymerization inhibitors such as sulfur dioxide, sulfonic acids, sultones, boron fluoride, hydroquinone, hydroquinone monomethyl ether, cathecol and pyrogarol. Although they can be added in a wide range of ratio, the addition ratio is generally selected from a range of about 0.0001 to about 5% by weight based on αcyanoacrylate.

Polymers, which are miscible to α-cyanoacrylate such as polymethylmethacrylate, poly-α-cyanoacrylate and acrylic rubber, are used as thickners. Although the addition ratio of said thickners can be widely changed, it is generally selected from a range of about 0.1 to about 50% by weight based on a α-cyanoacrylate.

Ordinary plasticizers such as dioctylphthalate, sebacic acid ester and phosphoric acid ester are used as plasticizers for giving the softness and flexibility to a bonded film.

Cross-linking agents play a role to improve the impact resistance of a bonded film by changing a linear α-cyanoacrylate to three dimensional network structure. Cross-linking agents used to this purpose include multifunctional compounds such as alkylenediacrylate, alkylenedimethacrylate, trimethylolpropanetriacrylate and triallylisocyanurate.

Although coloring matters are not required in cases where the compositions according to the present invention are used in the ordinary adhesive applications, they are required in cases where the compositions according to the present invention are used in the special applications, for example for drawing letters or figures instead of paints and colors and used as sealing materials as well as crack-repairing materials. Ordinary oil-soluble dyes and coloring matters can be used in these cases.

The compositions according to the present invention show remarkably superior heat resistance in comparison with α-cyanoacrylate without containing benzophenonetetracarboxylic acid or anhydride thereof. For example, although tensile shear strength of a composition, which is obtained by adding benzophenonetetracarboxylic acid anhydride to isobutyl-α-cyanoacrylate at a ratio of 0.5% by weight, measured at ordinary temperature after bonding at ordinary temperature followed by heating for 5 hours at 150° C. (133.5 Kg/cm$^2$) is increased rather than that measured after merely bonding at ordinary temperature (122.3 kg/cm$^2$), tensile shear strength of isobutyl α-cyanoacrylate without containing benzophenonetetracarboxylic acid anhydride measured at ordinary temperature after bonding at ordinary temperature followed by heating for 5 hours at 150° C. (36.9 kg/cm$^2$) is reduced to the value about $\frac{1}{4}$ times that measured after merely bonding at ordinary temperature (149.7 kg/cm$^2$). The superiority of a composition according to the present invention is obvious since such a heating condition of 150° C.×5 hours is more severe than the ordinary test condition of heat resistance for α-cyanoacrylate adhesives.

In addition, although it is disclosed in Japanese Pat. Publication No. 37263/1978 that certain kinds of aromatic polyvalent carboxylic acids or anhydrides thereof such as isophthalic acid, benzenepentacarboxylic acid, diphenic acid and trimellitic acid are added to α-cyanoacrylate in order to improve impact resistance, benzophenonetetracarboxylic acid or anhydride thereof is not described in this reference at all and the additives described in this reference cannot show heat resistance as superior as that of the compositions according to the present invention. Therefore, it can be said that benzophenonetetracarboxylic acid or anhydride thereof is a singular additive for giving α-cyanoacrylate heat resistance.

PREFERRED EMBODIMENTS OF THE INVENTION

Adhesive compositions according to the present invention will be described in more detail below with reference to the following examples and comparative examples.

A test method of tensile shear strength described hereinafter conforms to a method using iron-iron pieces in accordance with "Test method of α-cyanoacrylate adhesives" provided by Adhesive Industries Association (test methods similar to JIS K 6850).

EXAMPLE 1 AND COMPARATIVE EXAMPLE 1

Benzophenonetetracarboxylic acid anhydride is added to various kinds of α-cyanoacrylate containing sulfur dioxide of 10 ppm and hydroquinone of 300 ppp therein as stabilizers at a ratio of 0 to 0.5% by weight to prepare adhesives. Iron-iron pieces bonded together by means of the resulting adhesives were measured on tensile shear strength after standing still for 24 hours at ordinary temperature. In addition, iron-iron pieces bonded together by means of said adhesives were measured on tensile shear strength at ordinary temperature after standing still for 24 hours followed by heating in a thermostatic oven at 150° C. for 1 hour and 5 hours, respectively.

The results are shown in Table 1.

TABLE 1

| Addition quantity (%) | Heating condition | Kind of α-cyanoacrylate (kind of substituent R) | | | |
|---|---|---|---|---|---|
| | | R1 | R2 | R3 | R4 |
| *0.0 | Ordinary temperature | 171.1 | 175.6 | 149.7 | 71.4 |
| | 150° C. × 1 hour | 22.2 | 35.1 | 17.1 | 53.4 |
| | 150° C. × 5 hours | 11.9 | 28.1 | 36.9 | 30.5 |
| 0.1 | Ordinary temperature | 222.2 | 171.0 | 169.8 | 153.9 |
| | 150° C. × 1 hour | 40.3 | 94.9 | 87.8 | 126.1 |
| | 150° C. × 5 hours | 31.5 | 32.3 | 62.9 | 62.6 |
| 0.5 | Ordinary temperature | 225.2 | 159.3 | 122.3 | 173.4 |
| | 150° C. × 1 hour | 59.8 | 126.6 | 165.3 | 147.5 |
| | 150° C. × 5 hours | 40.3 | 41.7 | 133.3 | 74.2 |

Note 1 Mark * designates a blank test.
Note 2 The measured values of tensile shear strength are expressed with kg/cm$^2$ as the unit.
Note 3 In Table 1, R1 designates a methyl group, R2 designating an isopropyl group, R3 designating an isobutyl group, and R4 designating a 2-methoxyisopropyl group.

EXAMPLE 2 AND COMPARATIVE EXAMPLE 2

Various kinds of additive were added to adhesive compositions obtained in the same manner as in Example 1 except that ethyl α-cyanoacrylate is used for a α-cyanoacrylate at a ratio of 0 to 0.5% by weight as heat-resistance giving agents. Iron-iron pieces bonded together be means of the resulting adhesives containing said additives therein were measured on tensile shear strength after standing still for 24 hours at ordinary temperature. In addition, said iron-iron pieces were measured on tensile shear strength at ordinary temperature after standing still for 24 hours at ordinary temperature followed by heating at 150° C. for 1 hour and 5 hours, respectively.

The results in cases where benzophenonetetracarboxylic acid anhydride and benzophenonetetracarboxylic acid are added (Example 2) are shown in Table 2 and the results in cases where other additives are added (Comparative Example 2) are shown in Table 3.

TABLE 2

| Addition quantity (%) | Heating condition | Kind of additives | |
|---|---|---|---|
| | | A1 | A2 |
| * 0.0 | Ordinary temp. | 127.2 | |
| | 150° C. × 1 hour | 59.6 | |
| | 150° C. × 5 hours | 48.7 | |
| 0.1 | Ordinary temp. | 174.5 | 217.3 |
| | 150° C. × 1 hours | 98.7 | 95.5 |
| | 150° C. × 5 hours | 77.6 | 67.5 |
| 0.2 | Ordinary temp. | — | 191.5 |
| | 150° C. × 1 hour | — | 129.8 |
| | 150° C. × 5 hours | — | 107.5 |
| 0.5 | Ordinary temp. | 241.3 | — |
| | 150° C. × 1 hour | 136.1 | — |

TABLE 2-continued

| Addition quantity (%) | Heating condition | Kind of additives A1 | A2 |
|---|---|---|---|
| | 150° C. × 5 hours | 138.0 | — |

Note 1 Mark * designates a blank test.
Note 2 The measured values of tensile shear strength are expressed with kg/cm² as the unit.
Note 3 In Table 2, A1 designates benzophenonetetracarboxylic acid anhydride and A2 designates benzophenonetetracarboxylic acid.

TABLE 3

| Addition quantity (%) | Heating condition | Kind of additives B1 | B2 | B3 | B4 |
|---|---|---|---|---|---|
| 0.1 | Ordinary temperature | 99.2 | 210.3 | 136.8 | 112.2 |
| | 150° C. × 1 hour | 40.1 | 88.0 | 65.3 | 64.4 |
| | 150° C. × 5 hours | 42.5 | 51.0 | 58.8 | 41.6 |
| 0.2 | Ordinary temperature | — | 207.9 | — | — |
| | 150° C. × 1 hour | — | 64.1 | — | — |
| | 150° C. × 5 hours | — | 52.0 | — | — |
| 0.5 | Ordinary temperature | 81.0 | — | 118.1 | 213.6 |
| | 150° C. × 1 hour | 40.3 | — | 48.2 | 76.5 |
| | 150° C. × 5 hours | 40.0 | — | 40.5 | 62.5 |

Note 1 The measured values are expressed with kg/cm² as the unit.
Note 2 In Table 3, B1 designates isophthalic acid, B2 designating benzenepentacarboxylic acid, B3 designating diphenic acid, and B4 designating trimellitic acid anhydride.

As obvious also from the above described results of Example 1 and Example 2, benzophnonetetracarboxylic acid and anhydride thereof can remarkably improve heat resistance of α-cyanoacrylate in comparison with that of a blank test. Also it is found that the effect of improving heat resistance is remarkably larger in comparison with that of other aromatic polyvalent carboxylic acids or anhydrides thereof.

Since the heating condition of 150° C.×1 hour or 150° C.×5 hours adopted in the above described tests is much more severe than the practical burning condition, it can be said that the adhesive compositions according to the present invention can completely meet the requirements by the industrial fields in which heat resistance of the degree of 150° C. is requiired.

Industrial Applicability

As above described in detail, the present invention can give an effective solution to a problem of heat resistance of α-cyanoacrylate instant adhesives, whereby being capable of greatly contributing to an adhesive industrial field.

What is claimed is:

1. α-cyanoacrylate instant adhesive compositions, characterized by that benzophenonetetracarboxylic acid or anhydride thereof is incorporated into α-cyanoacrylate.

* * * * *